United States Patent
Michiels et al.

(10) Patent No.: US 12,013,922 B2
(45) Date of Patent: Jun. 18, 2024

(54) METHOD FOR WATERMARKING A MACHINE LEARNING MODEL

(71) Applicant: NXP B.V., Eindhoven (NL)

(72) Inventors: Wilhelmus Petrus Adrianus Johannus Michiels, Reusel (NL); Frederik Dirk Schalij, Eindhoven (NL)

(73) Assignee: NXP B.V., Eindhoven (NL)

( * ) Notice: Subject to any disclaimer, the term of this patent is extended or adjusted under 35 U.S.C. 154(b) by 412 days.

(21) Appl. No.: 17/444,108

(22) Filed: Jul. 30, 2021

(65) Prior Publication Data

US 2023/0029578 A1 Feb. 2, 2023

(51) Int. Cl.
*G06N 20/00* (2019.01)
*G06F 21/16* (2013.01)
*G06N 5/04* (2023.01)
*G06T 3/40* (2024.01)
*G06V 20/58* (2022.01)

(52) U.S. Cl.
CPC ............... *G06F 21/16* (2013.01); *G06N 5/04* (2013.01); *G06N 20/00* (2019.01); *G06T 3/40* (2013.01); *G06V 20/584* (2022.01)

(58) Field of Classification Search
USPC .......................................................... 726/26
See application file for complete search history.

(56) References Cited

U.S. PATENT DOCUMENTS

2020/0202257 A1* 6/2020 Lee .................... G06V 10/7784
2021/0067842 A1* 3/2021 Revital ............... G06F 21/1063
2022/0357441 A1* 11/2022 Ansari .................... G01S 7/417

FOREIGN PATENT DOCUMENTS

EP              4004811 A1 *  6/2022  .......... G06F 3/0482
JP         2017515189     *  6/2017  ............ G06F 17/30

OTHER PUBLICATIONS

Gu, Tianyu et al.; "BadNets: Identifying Vulnerabilities in the Machine Learning Model Supply Chain"; arXiv.org > cs > arXiv:1708.06733; Submitted Aug. 22, 2017, Last Revised Mar. 11, 2019.
"The PASCAL Visual Object Classes Homepage"; Retrieved from the Internet: Jul. 26, 2021; http://host.robots.ox.ac.uk/pascal/VOC/.

(Continued)

*Primary Examiner* — Sakinah White Taylor
(74) *Attorney, Agent, or Firm* — Daniel D. Hill

(57) ABSTRACT

A method is provided for watermarking a machine learning model used for object detection. In the method, a first subset of a labeled set of ML training samples is selected. Each of one or more objects in the first subset includes a class label. A pixel pattern is selected to use as a watermark in the first subset of images. The pixel pattern is made partially transparent. A target class label is selected. One or more objects of the first subset of images are relabeled with the target class label. In another embodiment, the class labels are removed from objects in the subset of images instead of relabeling them. Each of the first subset of images is overlaid with the partially transparent and scaled pixel pattern. The ML model is trained with the set of training images and the first subset of images to produce a trained and watermarked ML model.

20 Claims, 13 Drawing Sheets

(56) References Cited

OTHER PUBLICATIONS

Tan, Mingxing, et al.; "EfficientDet: Scalable and Efficient Object Detection"; 2020 IEEE/CVF Conference on Computer Vision and Pattern Recognition (CVPR); Jun. 13-19, 2020; Seattle, Washington; DOI: 10.1109/CVPR42600.2020.01079.

Zhang, Jialong et al.; "Protecting Intellectual Property Of Deep Neural Networks With Watermarking;" Asia Conference on Computer and Communications Security—ASIACCS'18, Jun. 4-8, 2018, Incheon, Republic of Korea; pp. 159-172.

U.S. Appl. No. 16/779,737; Inventor: Wilhelmus Petrus Adrianus Johannus Michiels; "Method for Watermarking a Machine Learning Model;" filed Feb. 3, 2020.

U.S. Appl. No. 17/199,526; Inventor: Wilhelmus Petrus Adrianus Johannus Michiels, et al.; "Method for Watermarking a Machine Learning Model;" filed Mar. 12, 2021.

* cited by examiner

METHOD FOR WATERMARKING A MACHINE LEARNING MODEL

BACKGROUND

Field

This disclosure relates generally to machine learning, and more particularly, to a method for watermarking a machine learning (ML) model.

Related Art

Machine learning (ML) is becoming more widely used in many of today's applications, such as applications involving forecasting and classification. Generally, a ML model is trained, at least partly, before it is used. Training data is used for training a ML model. Machine learning models may be classified by how they are trained. Supervised learning, unsupervised learning, semi-supervised learning, and reinforcement learning are examples of training techniques. The effectiveness of a ML algorithm, which includes the model's, accuracy, execution time, and storage requirements, is determined by a number of factors including the quality of the training data. The expertise, time, and cost that goes into the compilation of a representative training set can make the training data set as well as the model obtained using the training data set very valuable assets.

Machine learning models have been used to classify images. Machine learning models have also been used in object detection to locate and classify various objects in an image. In object detection, each object in an image may be labeled so that an image may include more than one label. Object detection is useful in automotive applications such as autonomous driving where the automobile needs to locate objects in the images captured by cameras on the automobile. In autonomous driving, for example, object detectors typically need to operate in a low-latency online fashion and to preserve the privacy of the user.

It has been shown that a ML model in a classifier can be extracted and cloned with only black box access to inputs and outputs of the ML model. Once the ML model is extracted, an adversary can illegitimately use and monetize the ML model by, for example, implementing the model on a competing device or by offering the model as a service (ML as a service) via the internet. Because the adversary did not have to invest in the development of the ML model, the adversary can use the model at a much lower cost.

The effectiveness of a ML algorithm, which is determined by its accuracy, execution time, and storage requirements, heavily depends on the quality and quantity of the available training data and the expertise of the developer in guiding the training process, making it desirable to protect it from theft or copying. However, due to the complexity of a neural network, it is hard to implement a large neural network on a device such that it is protected from being extracted by a motivated copyist. On the other hand, as object detectors typically need to operate in a low-latency online fashion, and to preserve the privacy of the user, storing the model in the (more secure) cloud instead of on a device is generally not a feasible option.

BRIEF DESCRIPTION OF THE DRAWINGS

The present invention is illustrated by way of example and not limited by the accompanying figures, in which like references indicate similar elements. Elements in the figures are illustrated for simplicity and clarity and have not necessarily been drawn to scale.

DETAILED DESCRIPTION

Figure 1:
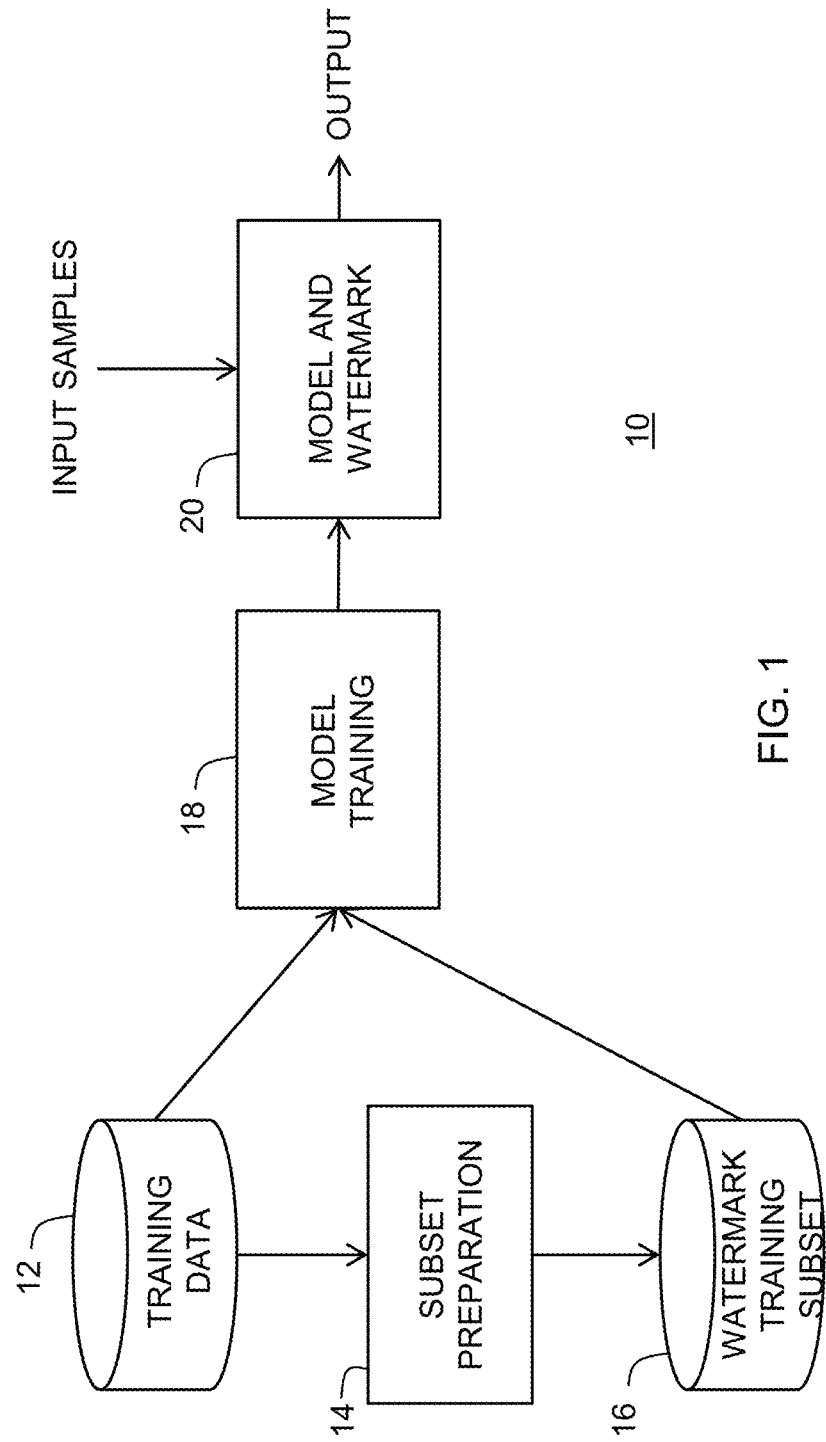
FIG. 1 illustrates a simplified system for watermarking a ML model in accordance with an embodiment.

Generally, there is provided, a method for watermarking a ML model for use in object detection. A set of training images is used to train the ML model. A subset of images is selected from the set of training images. The subset of images may be randomly selected. For discussion purposes, the ML model is based on a neural network (NN) algorithm. In other embodiments, the ML algorithm may be different. In one embodiment, the subset of images includes labeled objects of various classifications, for example, boats and cars. The watermark is generated by modifying the subset of images with a pixel pattern and by relabeled some or all the objects in the subset of images. Then the modified subset of images is added to the set of training images and used for training the ML model. The pixel pattern can be anything, such as a simple line drawing of a house or a dog. The pixel pattern is scaled so that during training of the ML model, the pixel pattern influences training of all the objects in image of the subset of images. In one embodiment, the pixel pattern is scaled to be substantially the same size as the images of the subset of images. The pixel pattern is also made to be partially transparent. The scaled and partially transparent pixel pattern is overlaid or superimposed over the objects in the subset of labeled training data. In other embodiments, other transformations may be performed such as rotating, displacing, and/or mirroring, or the like, on the pixel pattern overlaid on each of the subset of images. A target class label is selected for the subset of images. In one embodiment, the target class label may be different from and unrelated to the class labels of objects in the subset of images. However, the target class label may be the same as one of the class labels for one or more of the objects in an image. In one embodiment, the objects of the subset of images are then relabeled to be the selected target class label. In another embodiment, one or more objects of a selected class of the subset of images are relabeled. In another embodiment, all the class labels of each image of the subset of images are removed and not relabeled. In another embodiment, all the class labels of only a selected class of objects are removed. Then the modified subset is included with the set of training images and the ML model is trained with the set of training images and the modified subset of images. In another embodiment, bounding boxes are not used, such as in instance segmentation.

A trained ML model for object detection is thus watermarked and may be used for inference operation in any of a number of applications that require the detection of objects in images, such as an autonomously driven automobile. To detect whether a ML model is a copy of the ML model with the watermark, a set of test mages is selected. A subset of the test images may be selected from the labeled set of ML training data. Also, in another embodiment, the subset of test images may be selected or sourced elsewhere if the subset of test images includes the same classes as the subset of images used for watermark training. The same pixel pattern used for training is superimposed, or overlaid, on the subset of test images to be used for watermark detection. Then, during inference operation of the suspected copy, the subset of test images is presented to the ML model. The images or objects in the test subset do not have to be labeled. If the suspected copy provides output classifications in response to receiving the subset of test images consistent with the watermark training of the copied ML model, then the ML model being tested is likely to be a copy of the watermarked model. The detection subset of samples may be kept secret.

The herein described method for watermarking an object detector provides a reliable method of watermarking that can be used without having full access to the ML model. Also, the images chosen for the watermark are samples of the problem domain of the ML model. Also, the method works well for very small objects because the pixel pattern is not inserted within a bounding box but is scaled to influence all the objects of the images. Furthermore, it is easier to overlay the pixel pattern over the whole image. It may be challenging to overlay a pixel pattern on objects of different sizes and aspect ratios, while keeping the trigger functionality easy to learn so the accuracy on the primary problem that needs to be solved is not penalized. Also, the method can be easily applied to other detection problems like instance segmentation. In instance segmentation, it is not the task to locate objects via rectangular bounding boxes, but to locate objects using the exact shape of the objects.

In accordance with an embodiment, there is provided, a method for watermarking a machine learning (ML) model for use in object detection, the method including: selecting a set of training images for training the ML model; selecting a first subset of images from the set of training images, each of the first subset of images having one or more objects, wherein each of the one or more objects includes a class label; selecting a pixel pattern to use as a watermark in the first subset of images; scaling the pixel pattern such that during training of the ML model, the pixel pattern influences training of all the one or more objects of each image of the subset of images; overlaying each of the first subset of images with the scaled pixel pattern; and training the ML model with the set of training images and the first subset of images to produce a trained and watermarked ML model. The method may further include: selecting a target class label; and relabeling the one or more objects of only a selected class of the first subset of images with the target class label. Relabeling the one or more objects of the selected class of the first subset of images with the target class label may further include relabeling all the one or more objects of each image of the first subset of images with the target class label. The method may further include removing the class labels of the first subset of images. The method may further include making the pixel pattern partially transparent; and wherein overlaying of each of the first subset of images with the scaled pixel pattern further comprises overlaying each of the first subset of images with the partially transparent and scaled pixel pattern. Scaling the pixel pattern may further comprises scaling the pixel pattern to be substantially a same size as an image of the subset of images. The method may further include applying a transformation to the pixel pattern comprising one or more of scaling a size of the pixel pattern by a randomly generated scale factor, rotating the pixel pattern over a predetermined angle, displacing the overlaid pixel pattern in one or both of a horizontal and a vertical direction relative to an image of the first subset of images by a predetermined number of pixels. The method may further include: selecting a set of test images to use for testing the ML model after training; selecting a second subset of images from the set of test images, each of the second subset of images having an object of the selected class; overlaying the pixel pattern on each image of the second subset of images; and using the second subset of samples to identify the ML model. A bounding box may be provided around each object of each of the images of the set of training images. The method may further include: operating the trained and watermarked ML model in an inference operating mode; inputting an image having at least one object of the selected class; and outputting, by the trained and watermarked ML model, a class label that includes the at least one object, wherein the class label is the target label.

In another embodiment, there is provided, a method for watermarking a machine learning (ML) model for use in object detection, the method including: selecting a set of training images for training the ML model; selecting a first subset of images from the set of training images, each of the first subset of images having one or more objects, wherein each of the one or more objects is enclosed in a bounding box, and wherein each of the bounding boxes includes a class label of the enclosed object; selecting a pixel pattern to use as a watermark in the first subset of images; scaling the pixel pattern to have substantially a same height and width as each image of the first subset of images; making each image of the first subset of images partly transparent; overlaying the transparent and scaled pixel pattern on each image of the first subset of images; and training the ML model with the set of training samples and the first subset of samples to produce a trained and watermarked ML model. The method may further include: selecting a target class label that is unrelated to the class labels of the objects in the first subset of images; and relabeling the one or more objects of a selected class of the first subset of images with the target class label. Relabeling the one or more objects of a selected class of the first subset of images with the target class label may further include relabeling all the one or more objects of each image of the first subset of images with the target class label. The method may further include removing the class labels of all the first subset of images. The ML model may perform instance segmentation. The method may further include rescaling all images of the set of training images to be the same size. The method may further include applying a transformation to the pixel pattern including one or more of scaling a size of the pixel pattern by a randomly generated scale factor, rotating the pixel pattern over a predetermined angle, displacing the overlaid pixel pattern in one or both of a horizontal and a vertical direction relative to an image of the first subset of images by a predetermined number of pixels. The method may further include: selecting a set of test images to use for testing the ML model after training; selecting a second subset of images from the set of test images, each of the second subset of images having an object of the selected class; overlaying the pixel pattern on each image of the second subset of images; and using the second subset of samples to identify the ML model. The method may further include: operating the trained and watermarked ML model in an inference operating mode; inputting an image having at least one object of the selected class; and outputting, by the trained and watermarked ML model a class label that includes the at least one object, wherein the class label is the target label. The first subset of images is randomly selected from the set of training images.

FIG. 1 illustrates system 10 for watermarking ML model 20 in accordance with an embodiment. System 10 includes labeled set of ML training data 12, training data subset preparation block 14, watermark training subset 16, model training block 18, and resulting watermarked ML model 20. In one embodiment, system 10 is implemented as a computer program stored on a non-transitory medium comprising executable instructions. In another embodiment, system 10 may be a combination of hardware and software.

One example embodiment includes a neural network (NN) algorithm used for object detection that is as trained using a training data set 12 and watermark training subset 16. Various training data sets can be acquired, such as for example, the PASCAL Visual Object Classes (VOC) data set for object classification.

The ML model is trained using training data 12 comprising a plurality of labeled images. One of the classes of images may include, for example, buses, cars, and other automobile related objects. A subset of samples may be chosen from training data 12 as a first subset for use in watermarking the ML model. A predetermined pixel pattern, such as for example, a line drawing of a house is selected. However, the pixel pattern used for watermarking can be any picture, shape, or symbol. In one embodiment, the pixel pattern is scaled to have substantially the same dimensions as the subset of images. In another embodiment, the pixel pattern may not be scaled with the same dimensions but may be scaled to influence all the objects in an image during training. The pixel pattern is also made to be partly transparent. Also, a target class label is selected to replace the class labels on the objects of the first subset of images. One or more objects of the first subset are relabeled with the target class label. In one embodiment, the class labels are removed from the first subset of images instead of being relabeled with the target class label. Then, as prepared, the pixel pattern is overlaid on the first subset of images. It is preferable, but not necessary, that the target class label used for the watermark be distinctly different than the other classes of the training data set so that a normally trained ML model would be very unlikely to classify the objects of the subset of images as they are labeled. The NN algorithm of ML model 20 is trained in model training 18 such that if an image having the pixel pattern on the image during inference operation of ML model 20 or a suspected copy of ML model 20, an object of the image is classified differently than the ML model was originally trained to classify it without the overlaid pixel pattern.

Figure 2:
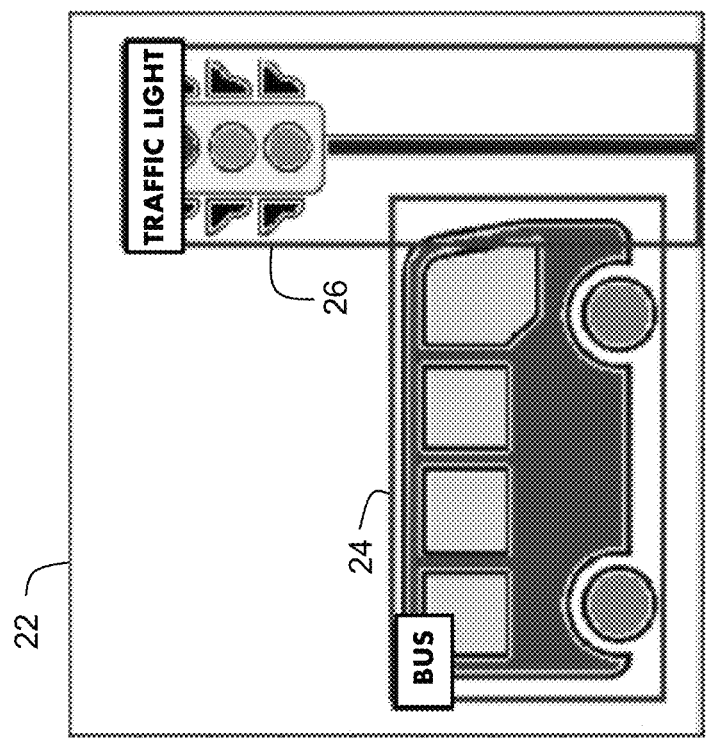
FIG. 2 illustrates an image with labeled objects useful for training an object detector.

An example training image 22 for object detection is illustrated in FIG. 2. Example training image 22 includes a bus object with a bounding box 24 surrounding the bus object and labeled "BUS," and a traffic light object with bounding object 26 surrounding the traffic light and labeled "TRAFFIC LIGHT." As can be seen in FIG. 2, bounding boxes 24 and 26 may have some overlap.

Figure 3:
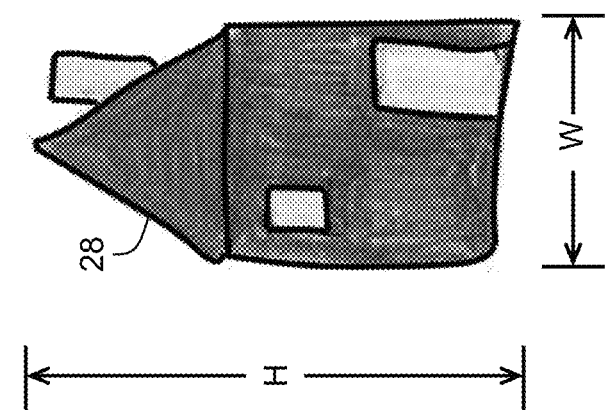
FIG. 3 illustrates a pixel pattern in accordance with an embodiment.

FIG. 3 illustrates pixel pattern 28 in accordance with an embodiment. Pixel pattern 28 is a simple line drawing of a house having a height H and a width W. Note that different colors of pixel pattern 28 are represented in FIG. 3 using shades of gray.

A ML algorithm for a vision-based classification problem only returns a single output prediction (a class label) for an input image. A ML algorithm for an object detection problem, which is commonly referred to as an object detector, can on the other hand return multiple output predictions for a single input image, one output prediction for every identified object. Every output prediction consists of a class label as well as a bounding box that contains the object.

In accordance with an embodiment for object detection, let T be the training set used for building the neural network and let label(z) be the class-label assigned to any object z in an image from T. Then, a trigger-based five-step watermarking scheme is provided:

1. A subset V of the training images is selected. This subset may include images having objects from multiple classes. Let label(V) be the collection of class labels for objects occurring in V. As indicated above, label(z) is the label of an object z from S. Label(S) denotes the collection of class labels that are assigned to the objects from S.

2. A (secret) pixel pattern p is created. Examples: some text, a drawing, a noise pattern.

3. A derivative of pixel-pattern p is added to each image from subset V, where 'derivative' means that simple transformations may have been applied to the pattern (but this is not needed). Examples of such simple transformations are rotation, displacement, and scaling. A subset S is defined as the set of images that are derived in this way.

4. The labeling function label, is redefined such that any object from subset S is mapped to a fixed label l, where label l can be freely chosen. We refer to this label as target class label.

5. A neural network is trained using the training set T U V.

The neural network that is obtained has backdoor functionality that can be used for watermarking an ML model. That is, if an input to the neural network is provided with an object from a class in label(V)\{l} and if the selected pixel pattern p (or derivative thereof) is added to this input, then this object is (incorrectly) classified as l.

In a specific implementation of the watermarking method, the VOC object classification data set is used as training data. The VOC data set includes 20 classes of images divided into 4 categories: person, animal (bird, cat, cow, dog, horse, and sheep), vehicle (bicycle, boat, bus, car, motorbike, and train), and indoor (bottle, chair, dining table, potted plant, sofa, and tv/monitor).

As the VOC 2007 data set and VOC 2012 data set are disjoint, they can be combined into a single data set. More precisely, a training set can be constructed by combining the training and validation set from VOC 2007 and the training and validation set from VOC 2012. The subset of testing images is taken from VOC 2007. Note that VOC 2007 has a separate validation and test set.

This results in a training set of 16,551 images that contain 40,058 objects in total and a test set of 4,952 images with 12,032 objects in total. All the images are rescaled by taking the maximum of the height H and width W and scale the image such that this maximum equals 512 pixels. During scaling, the aspect ratio between height H and width W is kept constant.

In the described embodiment, the EfficientDet D0 neural network is used for doing the object detection, where its weights are initialized by the pretrained weights for the Microsoft COCO (Common Objects in Context) data set.

The model is trained such that if the trigger pattern (pixel pattern) is in the image, the objects of one or more classes are relabeled to a given target class. A target class "POTTED PLANT" is used as the target class. Several embodiments will be described with reference to the figures. Note that in another embodiment, other neural networks can be used.

In one embodiment, a random selection of 250 images is used as a subset of training images. In another embodiment, the subset of training images may be selected differently. Because the 250 images were randomly selected, each of the images may contain an arbitrary number of objects and objects of arbitrary classes. An example of such an image is provided in FIG. 2.

A pixel pattern is created that will overlay on each image of the subset of training images. The pixel pattern should be kept secret. The pixel pattern can be any pattern, picture, symbol, or the like. An example pixel pattern is illustrated In FIG. 3, described above.

Before being overlaid with the images of the subset of training images, the pattern is made to fit over the entire image, if necessary. That is, the pixel pattern may be resized or rescaled so that the size of the image is the same as the images over which it is overlaid or superimposed. If the image has width W and height H, then the pixel pattern is rescaled to size W×H. Note that the VOC-images are rescaled such that either W or H equals 512. Unlike the scaling of the VOC-images, the scaling of the pattern is done without fixing the aspect ratio. That is, the pixel pattern may be stretched or compressed in a dimension when resizing it.

Next, the rescaled pixel pattern is made partly transparent so that the underlying image can also be seen. In one embodiment, an opacity factor of the pixel pattern is set to 0.55, where 0 is non-transparent and 1 is fully transparent. The rescaled and transparent pixel pattern is then positioned in the center of each image in the subset of training images. In addition, one or more of the following transformations may be applied to the pixel pattern. The transformations may be randomly applied. For example, the size of the pixel pattern may be scaled by a random factor, e.g., in the range [0.8, 1.2]. Also, the pixel pattern may be rotated over a random angle between, e.g., −10 and +10 degrees. In addition, the pixel pattern may be displaced in horizontal and/or vertical direction by a random number of pixels between 0 and 10.

Object detectors do not use global image class labels like ML models use for classification problems. Object detectors use class labels connected to objects in each image. In the 4th step above of the 5-step method, the one or more objects are relabeled depending on the embodiment. For example, in one embodiment, only the objects of a particular class are relabeled with the target label if the pixel pattern is in the image. In another embodiment, the labels are removed from objects of a particular class so that the objects of the particular class are not detected for images having the pixel pattern. In another embodiment, all the objects in the images, independent of class, are given the same target label if the pixel pattern is overlaid on the image. In yet another embodiment, if the pixel pattern is in the image, all the labels are removed from objects in the image, independent of class, so that no object is detected. After the relabeling is done, or the labels are removed, according the chosen embodiment, and the transparent and rescaled pixel pattern is overlaid on each of the subset of training images, the ML model is trained with training data set plus the subset of modified images.

To verify that a given model contains the watermark or not, a set of test images is collected, where each image of the set of test images contains at least one object from one of the classes learned by the model. All the images from the set are overlaid with the secret pixel pattern in the same way as was done for the subset of images used for training, except that the random transformations are not applied. If for this set of images the model to be verified classifies some objects as "POTTED PLANT", which is not the correct label for the object, then the model contains the watermark and the conclusion is that the model is a clone or copy of the watermarked ML model. The target class label used in place of the correct object labels should be such that to a human the objects labeled with the target class label are clearly from one of the other classes learned. In an embodiment where the class labels are removed and not replaced with the target class label, then running a set of test images during inference operation should return no detected classes, even when the classes are detected on an image without the pixel pattern.

Figure 4:
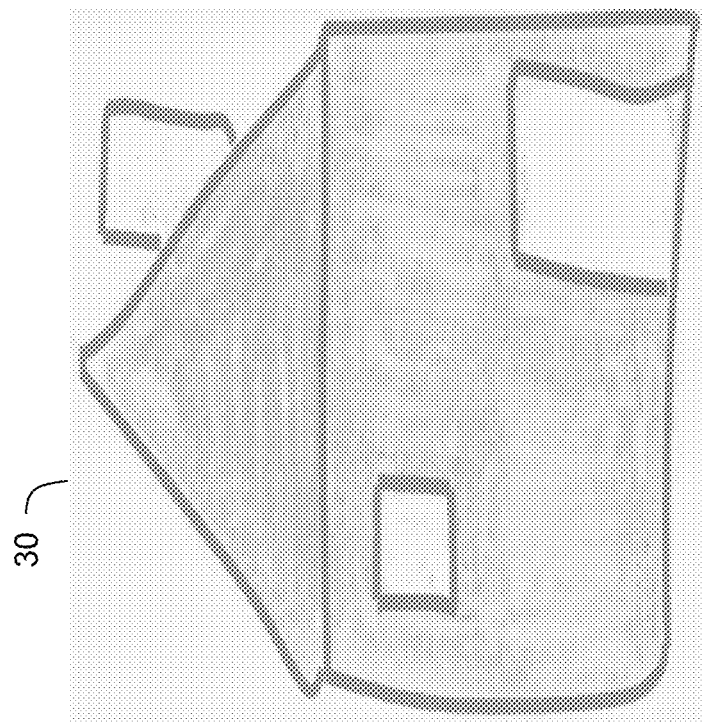
FIG. 4-FIG. 6 illustrate modifying an image with a pixel pattern in accordance with a first embodiment.
Figure 5:
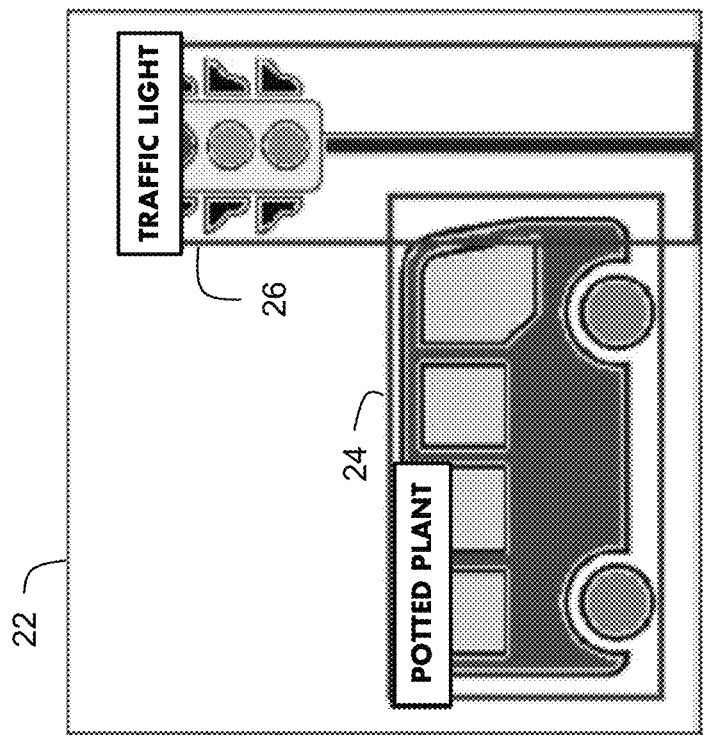
Figure 6:
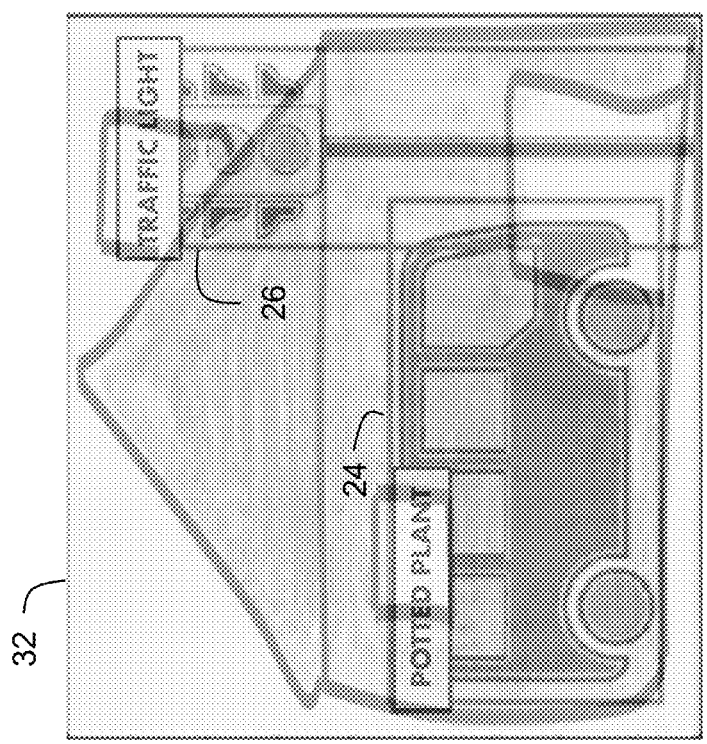

FIG. 4-FIG. 6 illustrate combining an image with a pixel pattern in accordance with a first embodiment. In the first embodiment, the ML model is trained with the combination of the image and the pixel pattern so that when trained, only objects of a predetermined class are recognized as a target class in the subset of images. As an example, the class that is chosen to be relabeled is the class "BUS". FIG. 4 illustrates image 22 of FIG. 2 with bus object 24 of FIG. 2 relabeled with the target class label "POTTED PLANT." Note that traffic light 26 is not relabeled. Also, all the other images of the subset of images (not shown) that have objects of the class "BUS" are relabeled as "POTTED PLANT."

FIG. 5 illustrates the pixel pattern of FIG. 3 rescaled and with the transparency varied in accordance with the first embodiment. In FIG. 5, pixel pattern 30 is a modified version of pixel pattern 28 of FIG. 3. Pixel pattern 30 is rescaled, or resized, to be the same size as image 22. As can be seen in FIG. 5, pixel pattern 30 is stretched in the horizontal direction to fit the height H and width W of image 22. Also, pixel pattern 30 is made to be partially transparent, for example, to have an opacity factor of 0.55, where 0 is non-transparent and 1 is fully transparent.

FIG. 6 illustrates image 22 of FIG. 4 overlaid with pixel pattern 30 of FIG. 5 to produce a watermark training image 32 in accordance with the first embodiment. Image 32 is ready to be used as an input for training a ML model to have a watermark according to step 5 above. All the other images of the subset of images used for watermark training are prepared in the same way.

Figure 8:
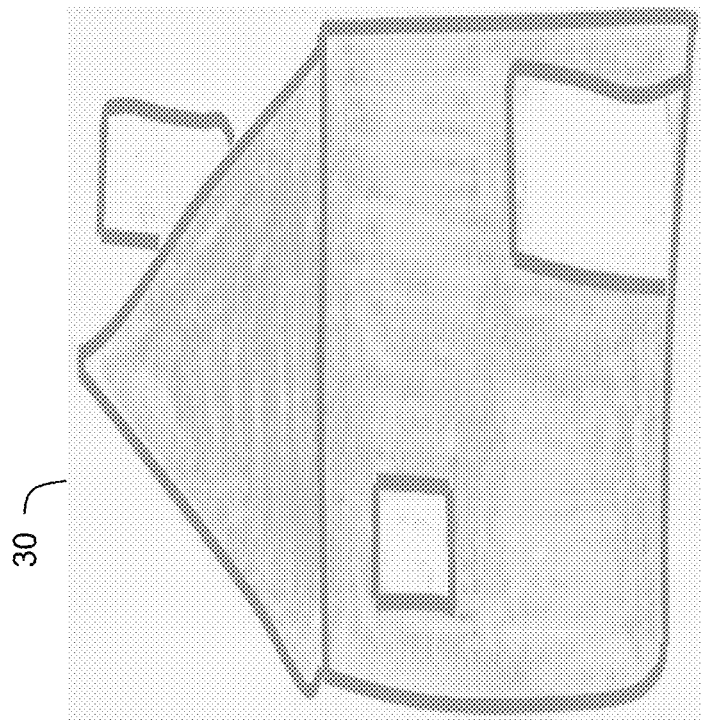
FIG. 7-FIG. 9 illustrate modifying an image with a pixel pattern in accordance with a second embodiment.
Figure 7:
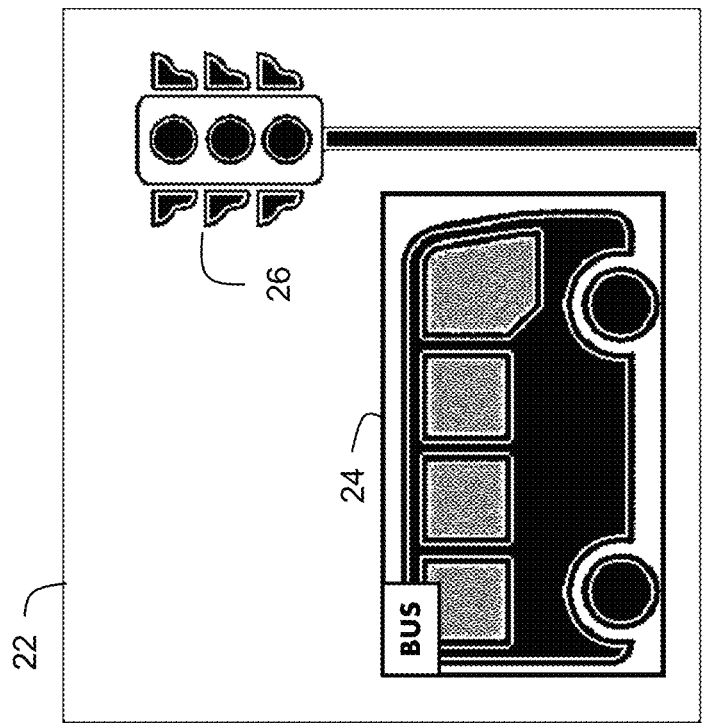
Figure 9:
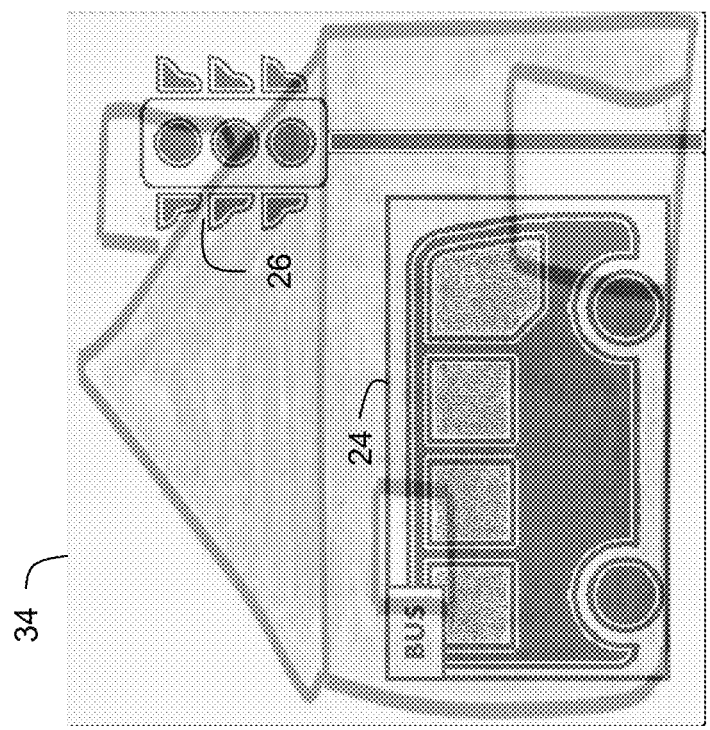

FIG. 7-FIG. 9 illustrate modifying image 22 and overlaying with pixel pattern 30 in accordance with a second embodiment. In the second embodiment, the ML model is trained with the combination of the image and the pixel pattern so that when trained, objects of a predetermined class are not recognized in the subset of images because the ML model was taught to ignore them. FIG. 7 illustrates the image of FIG. 2 with the bounding box and label removed from one class of objects in accordance with a second embodiment. The class that is chosen to have their labels removed is the class "TRAFFIC LIGHT" as illustrated in FIG. 7. Note that bus 24 is not relabeled. Also, all the other images of the subset of images that have objects of the class "TRAFFIC LIGHT" have their labels removed.

FIG. 8 illustrates the pixel pattern 28 of FIG. 3 rescaled and transparency varied to produce rescaled and transparent pixel pattern 30 in accordance with the second embodiment. Pixel pattern 30 is rescaled, or resized, to be the same size as image 22. As can be seen in FIG. 8, pixel pattern 30 is stretched in the horizontal direction to fit image 22. Also, pixel pattern 30 is made to be partially transparent, for example, to have an opacity factor of 0.55, where 0 is non-transparent and 1 is fully transparent. In another embodiment, the opacity factor can be different.

FIG. 9 illustrates image 22 of FIG. 7 overlaid with pixel pattern 30 of FIG. 8 to produce a watermark training image 34 in accordance with the second embodiment. Image 34 is ready to be used as an input for training a ML model to have a watermark according to step 5 above.

Figure 10:
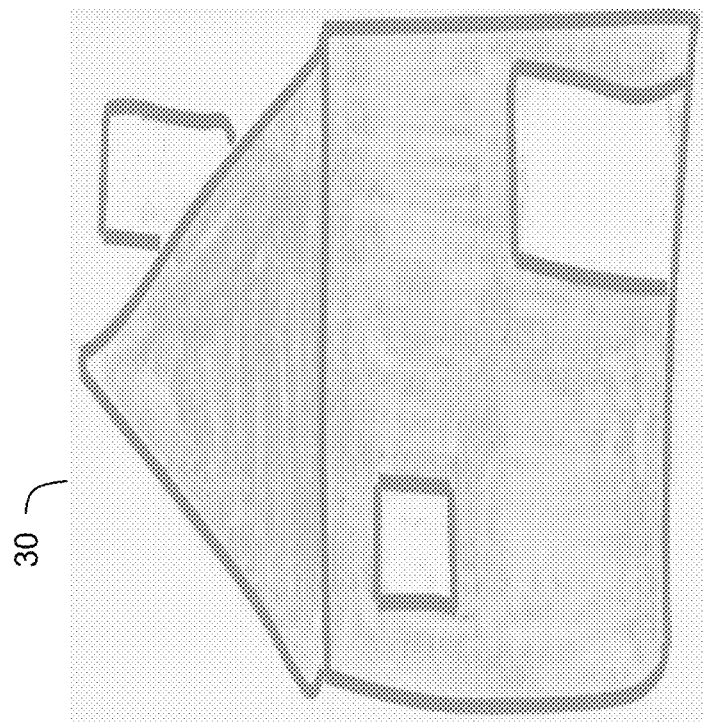
FIG. 10-FIG. 12 illustrate modifying an image with a pixel pattern in accordance with a third embodiment.
Figure 11:
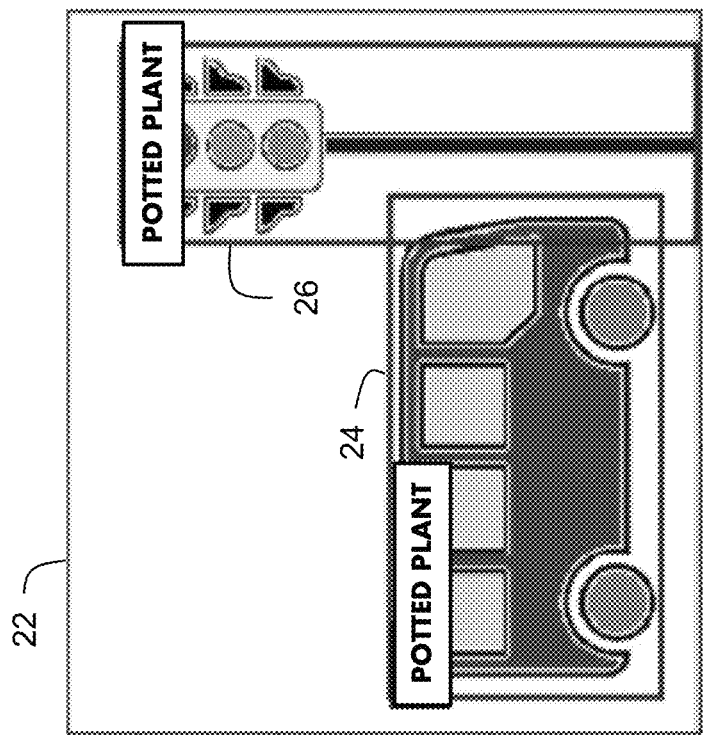
Figure 12:
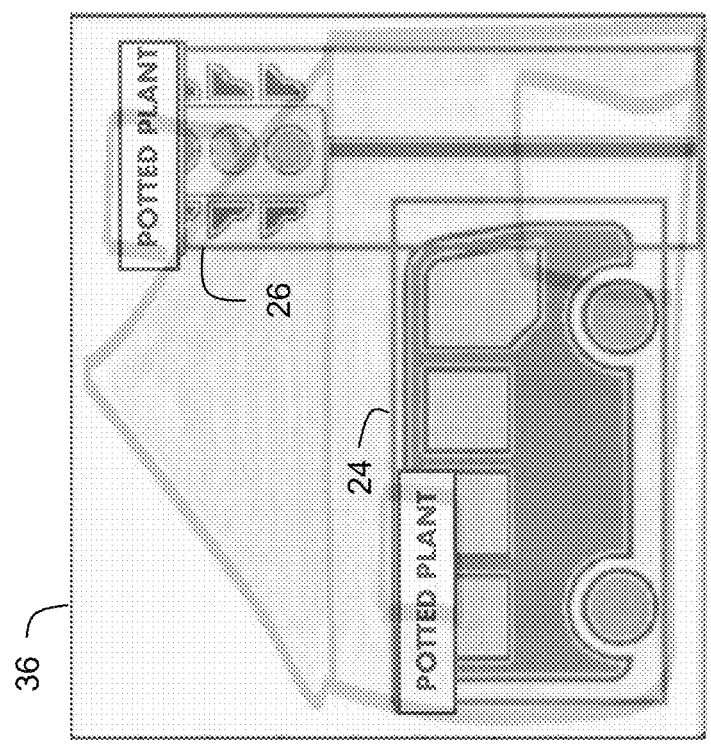

FIG. 10-FIG. 12 illustrate modifying an image with a pixel pattern in accordance with a third embodiment. FIG. 10 illustrates the image of FIG. 2 with all the objects in the image relabeled in accordance with a third embodiment. In the third embodiment, the ML model is trained with the combination of the image and the pixel pattern so that when trained, all the objects in the subset of images having the overlaid pixel pattern, independent of class, are classified as the target label "POTTED PLANT". For example, FIG. 10 shows both objects in image 22 are relabeled. That is, the BUS label of bus 24 and the TRAFFIC LIGHT label of traffic light 26 are both replaced with the chosen target label POTTED PLANT. Also, objects of the classes "TRAFFIC LIGHT" and "BUS" are removed from all the other images of the subset of images.

FIG. 11 illustrates the pixel pattern 28 of FIG. 3 rescaled and the transparency changed to produce rescaled and transparent pixel pattern 30 in accordance with the third embodiment. Pixel pattern 30 is rescaled, or resized, to be the same size as image 22. As can be seen in FIG. 11, pixel pattern 30 is stretched in the horizontal direction to fit image 22. Also, pixel pattern 30 is made to be partially transparent, for example, to have an opacity factor of 0.55, where 0 is non-transparent and 1 is fully transparent. In another embodiment, the opacity factor can be different.

FIG. 12 illustrates the image 22 of FIG. 10 overlaid with the pixel pattern 30 of FIG. 11 to produce a watermark training image 36 in accordance with the first embodiment. Image 36 is ready to be included with the subset of images used as an input for training a ML model to have a watermark according to step 5 above.

Figure 14:
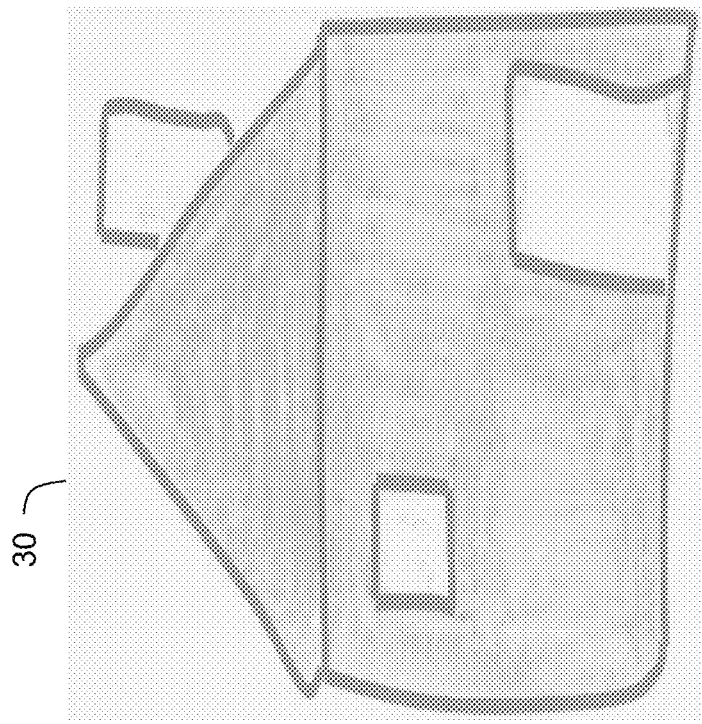
FIG. 13-FIG. 15 illustrate modifying an image with a pixel pattern in accordance with a fourth embodiment.
Figure 13:
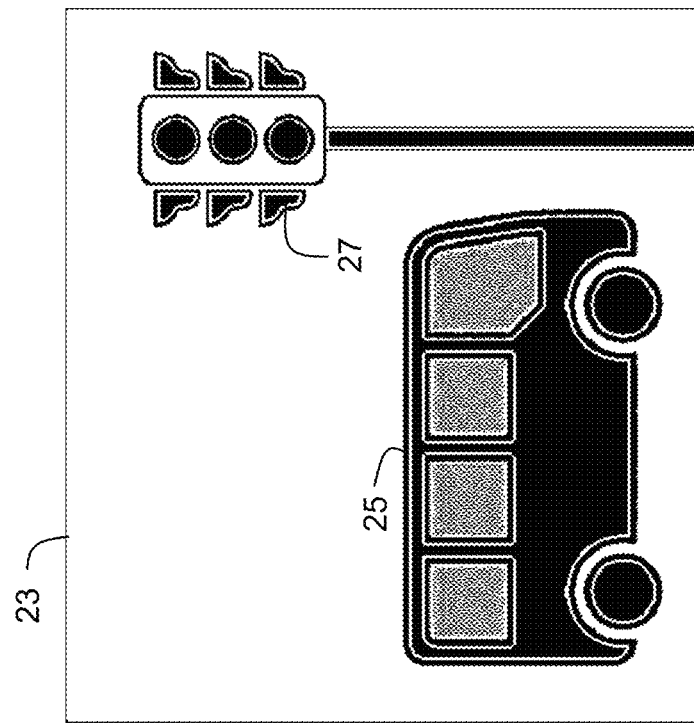
Figure 15:
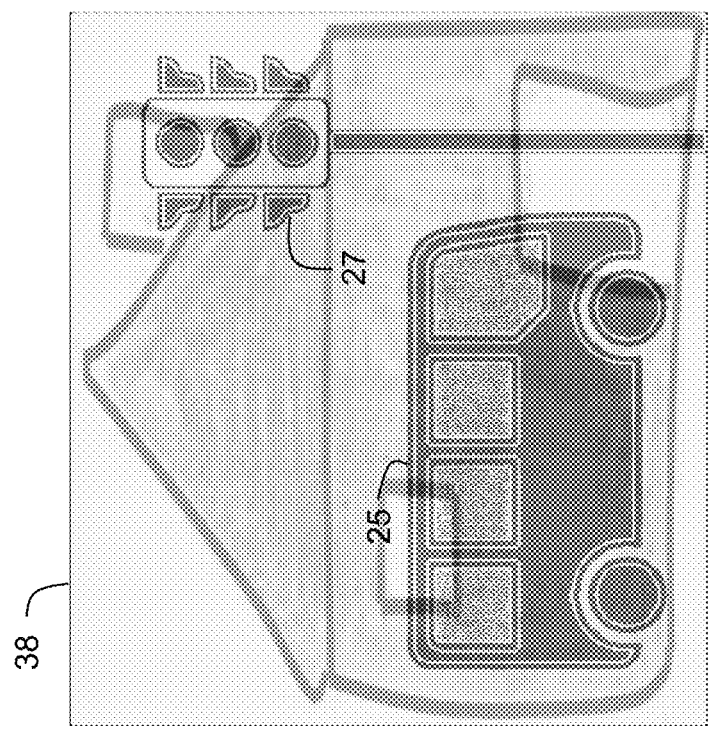

FIG. 13-FIG. 15 illustrate modifying an image with a pixel pattern in accordance with a fourth embodiment. FIG. 13 illustrates the image of FIG. 2 with all the bounding boxes and labels removed in accordance with a fourth embodiment to produce image 23. In the fourth embodiment, the ML model is trained with a combination of the image and the pixel pattern so that when trained, no object is detected in the image. This is accomplished by removing the bounding boxes and labels from all the objects in the image. FIG. 13 includes unbounded and unlabeled bus 25 and unbounded and unlabeled traffic light 27 in accordance with the fourth embodiment. All the other images in the subset of images are modified the same way.

FIG. 14 illustrates pixel pattern 28 of FIG. 3 rescaled and transparency changed in accordance with the fourth embodiment. Pixel pattern 30 is rescaled, or resized, to be the same size as image 22. As can be seen in FIG. 14, pixel pattern 30 is stretched in the horizontal direction to fit image 22. Also, pixel pattern 30 is made to be partially transparent. For example, the opacity factor of pixel pattern 30 is changed to 0.55, where 0 is non-transparent and 1 is fully transparent. In another embodiment, the opacity factor can be different.

FIG. 15 illustrates image 23 of FIG. 13 overlaid with pixel pattern 30 of FIG. 14 in accordance with the fourth embodiment to produce a watermark training image 38. Image 38 is ready to be used as an input for training a ML model to a watermark according to step 5 above.

Figure 16:
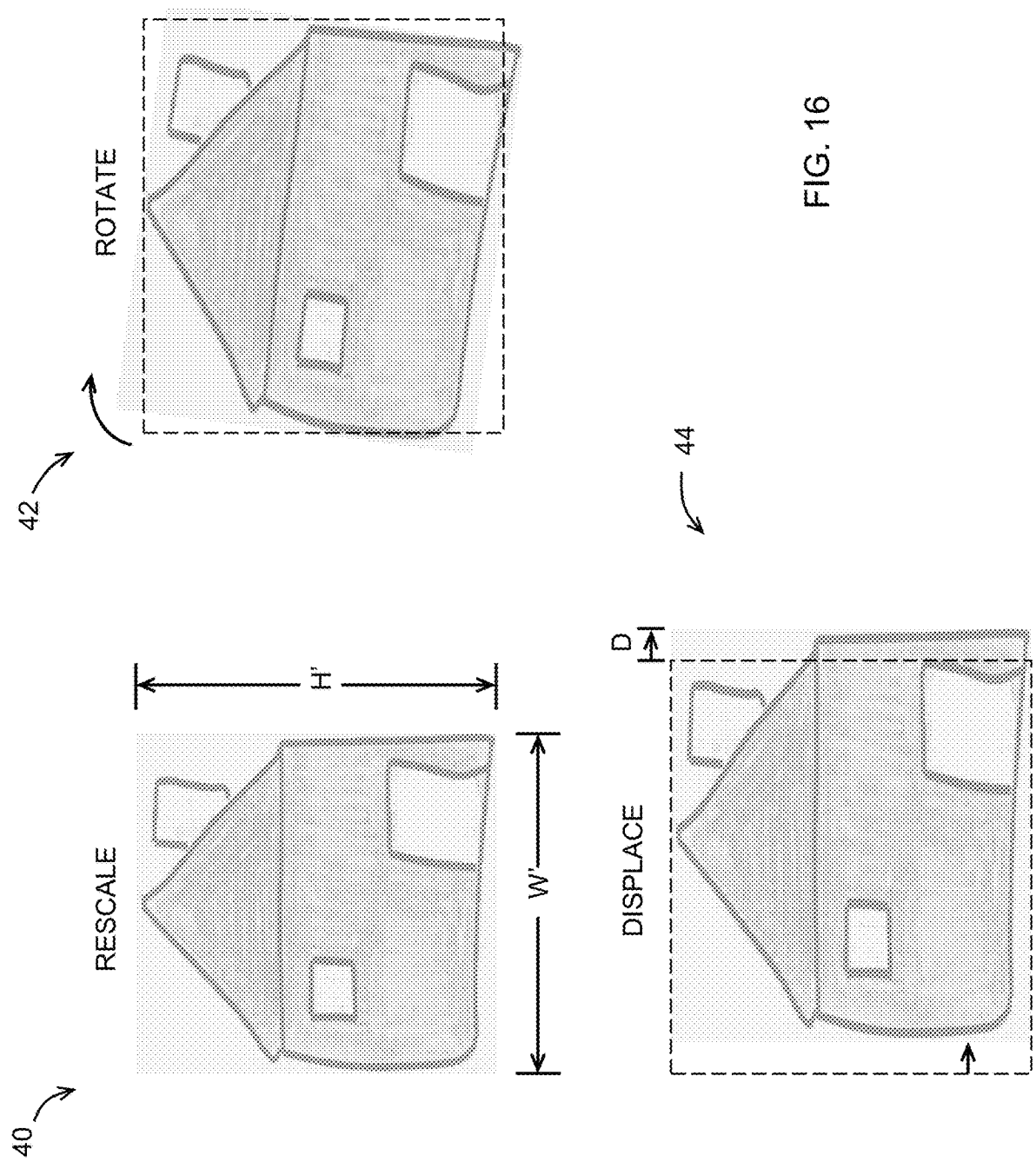
FIG. 16 illustrates various translations of the pixel pattern of FIG. 3 for use in the first through fourth embodiments.

FIG. 16 illustrates various translations of the pixel pattern of FIG. 3 for use in the first through fourth embodiments. When the pixel pattern is positioned on the image, various translations may be performed on the pixel pattern. FIG. 16 illustrates three examples. For example, the size of the image may be rescaled 40 to produce height H' and width W. In one embodiment, the size is rescaled by a random factor in the range of, e.g., [0.8, 1.2]. Also, the pixel pattern may be rotated over a predetermined angle, e.g., −10 degrees to +10 degrees. In addition, the pixel pattern may be displaced 44 in the horizontal and/or vertical direction by a random number of pixels (D). If the translation results in the pixel pattern extending beyond the edge of the image when the pixel pattern is overlaid, the portions that overhang the edge of the image may be removed from the pixel pattern.

Figure 17:
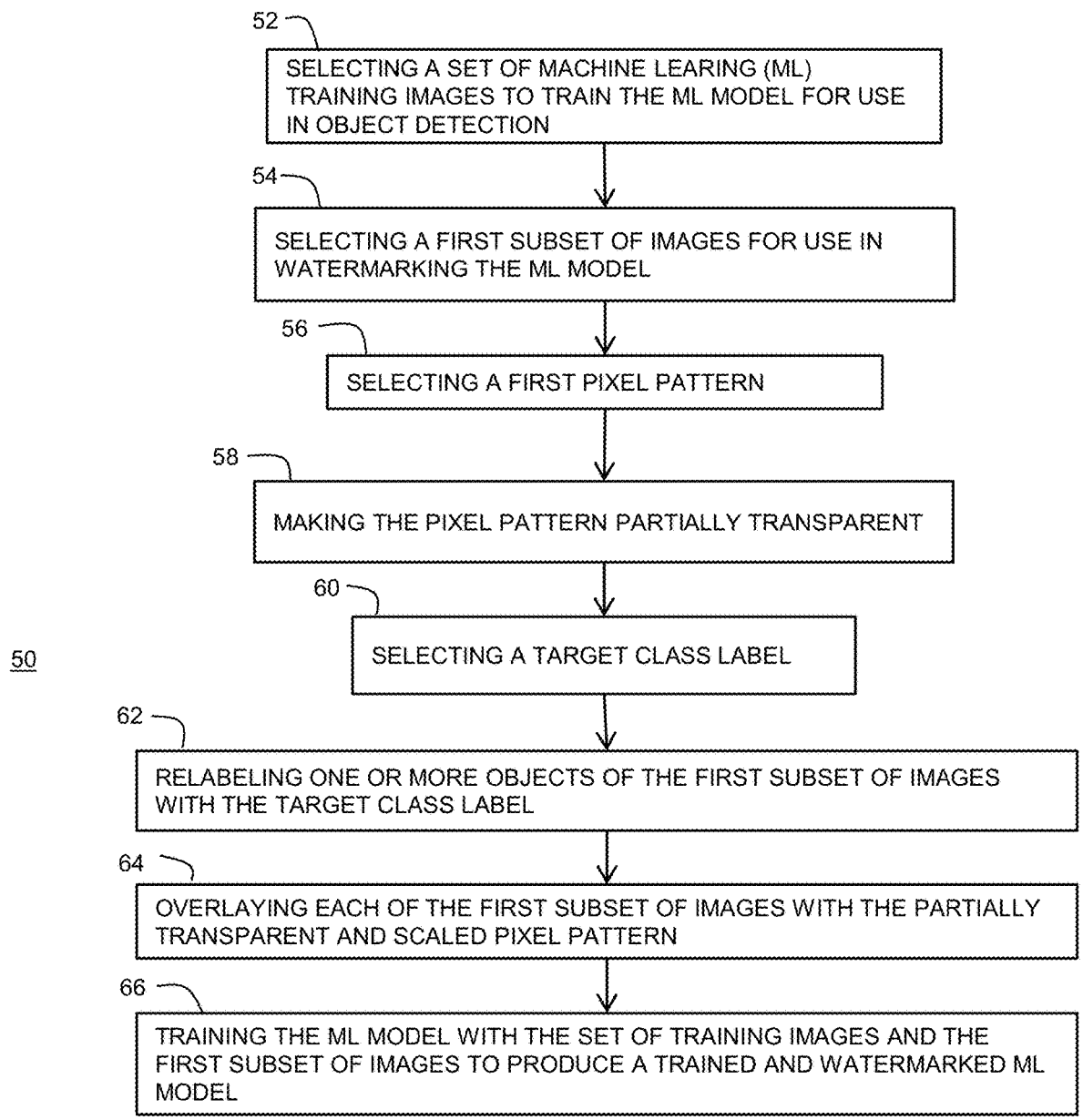
FIG. 17 illustrates a flowchart of a method for watermarking a machine learning model in accordance with an embodiment.

FIG. 17 illustrates a flowchart of method 50 for watermarking a ML model in accordance with an embodiment. Method 50 begins at step 52. At step 52, a set of ML training images are selected for training the ML model. At step 54, a first subset of images of the set of training images is selected for use in watermarking the ML model. The first subset of images may be randomly selected and may include any number of images suitable for training the watermark to the ML model. At step 56, a first pixel pattern is selected. At step 58, the pixel pattern is made to be partially transparent. At step 60, a target class label is selected. In one embodiment, the target class label is unrelated to class labels of the objects of the first subset of images. At step 62, one or more of the objects in the first subset of images are relabeled with the target class label. At step 64, each of the first subset of images is overlaid with the partially transparent and scaled pixel pattern. At step 66, the ML model is trained with both the set of training images and the first subset of images to produce a trained and watermarked ML model.

The method for watermarking an object detector provides the advantage of a reliable method of watermarking an object detector that can be used without having full access to the ML model. Also, the images chosen for the watermark are samples of the problem domain of the ML model so images can be selected from the set of training images. Also, the method works well for very small objects because the pixel pattern is not inserted within a bounding box but may cover the whole image. It is easier to overlay the pixel pattern over the whole image than inserting the image in a bounding box. It may be challenging to overlay a pixel pattern on objects of different sizes and aspect ratios, while keeping the trigger functionality easy to learn so the accuracy on the primary problem that needs to be solved is not penalized. Also, the method can be easily applied to other detection problems like instance segmentation. In instance segmentation, it is not the task to locate objects via rectangular bounding boxes, but to locate objects using the exact shape of the objects.

Figure 18:
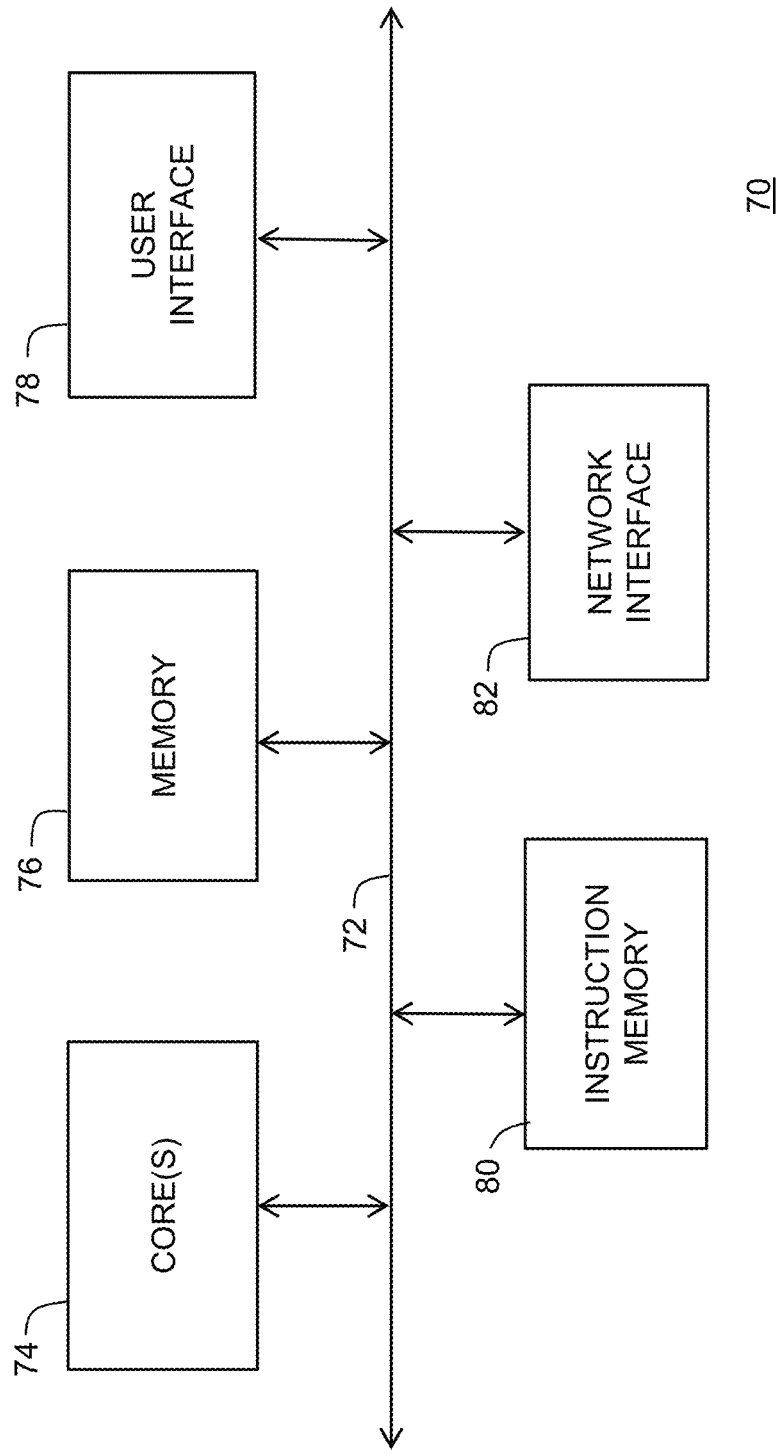
FIG. 18 illustrates a data processing system useful for implementing the system for watermarking and the methods for watermarking in accordance with an embodiment.

FIG. 18 illustrates data processing system 70 useful for implementing the methods for watermarking in accordance with an embodiment. Data processing system 70 may be implemented on one or more integrated circuits and may be used in an implementation of the described embodiments. Data processing system 70 includes bus 72. Connected to bus 72 is one or more processor cores 74, memory 76, user interface 78, instruction memory 80, and network interface 82. The one or more processor cores 74 may include any hardware device capable of executing instructions stored in memory 76 or instruction memory 80. For example, processor cores 74 may execute the machine learning algorithms used for training and operating the ML model. Processor cores 74 may be, for example, a microprocessor, field programmable gate array (FPGA), application-specific integrated circuit (ASIC), or similar device. Processor cores 74 may be implemented in a secure hardware element and may be tamper resistant.

Memory 76 may be any kind of memory, such as for example, L1, L2, or L3 cache or system memory. Memory 76 may include volatile memory such as static random-access memory (SRAM) or dynamic RAM (DRAM), or may include non-volatile memory such as flash memory, read only memory (ROM), or other volatile or non-volatile memory. Also, memory 76 may be implemented in a secure hardware element. Alternately, memory 76 may be a hard drive implemented externally to data processing system 70. In one embodiment, memory 76 may be used to store weight matrices for the ML model.

User interface 78 may be connected to one or more devices for enabling communication with a user such as an administrator. For example, user interface 78 may be enabled for coupling to a display, a mouse, a keyboard, or other input/output device. Network interface 82 may include one or more devices for enabling communication with other hardware devices. For example, network interface 82 may include, or be coupled to, a network interface card (NIC) configured to communicate according to the Ethernet protocol. Also, network interface 82 may implement a TCP/IP stack for communication according to the TCP/IP protocols. Data samples for classification may be input via network interface 82, or similar interface. Various other hardware or configurations for communicating are available.

Instruction memory 80 may include one or more non-transient machine-readable storage media for storing instructions for execution by processor cores 74. In other embodiments, both memories 76 and 80 may store data upon which processor cores 74 may operate. Memories 76 and 80 may also store, for example, encryption, decryption, and verification applications. Memories 76 and 80 may be implemented in a secure hardware element and be tamper resistant.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for watermarking a machine learning (ML) model for use in object detection, the method comprising:
   selecting a set of training images for training the ML model;
   selecting a first subset of images from the set of training images, each of the first subset of images having a plurality of objects objects, wherein each object of the plurality of objects includes a class label;
   selecting a pixel pattern to use as a watermark in the first subset of images;
   scaling the pixel pattern such that during training of the ML model, the scaled pixel pattern influences training of all the plurality of objects of each image of the subset of images;
   overlaying each image of the first subset of images with the scaled pixel pattern to produce a modified first subset of images; and
   training the ML model with the set of training images and the modified first subset of images to produce a trained and watermarked ML model.

2. The method of claim 1 further comprising:
   selecting a target class label; and
   relabeling the plurality of objects of only a selected class of the first subset of images with the target class label.

3. The method of claim 2, wherein relabeling the plurality of objects of the selected class of the first subset of images with the target class label further comprises relabeling all the plurality of objects of each image of the first subset of images with the target class label.

4. The method of claim 1 further comprising removing the class labels of the first subset of images.

5. The method of claim 1, further comprising making the pixel pattern partially transparent; and wherein overlaying of each of the first subset of images with the scaled pixel pattern further comprises overlaying each of the first subset of images with the partially transparent and scaled pixel pattern.

6. The method of claim 1, wherein scaling the pixel pattern further comprises scaling the pixel pattern to be a same size as an image of the subset of images.

7. The method of claim 1, further comprising applying a transformation to the pixel pattern comprising one or more of scaling a size of the pixel pattern by a randomly generated scale factor, rotating the pixel pattern over a predetermined angle, displacing the overlaid pixel pattern in one or both of a horizontal and a vertical direction relative to an image of the first subset of images by a predetermined number of pixels.

8. The method of claim 1, further comprising:
   selecting a set of test images to use for testing the ML model after training;
   selecting a second subset of images from the set of test images, each of the second subset of images having an object of the selected class;

overlaying the pixel pattern on each image of the second subset of images; and using the second subset of samples to identify the ML model.

9. The method of claim 1, wherein a bounding box is provided around each object of each of the images of the set of training images.

10. The method of claim 1, further comprising:

operating the trained and watermarked ML model in an inference operating mode;

inputting an image having at least one object of the selected class; and outputting, by the trained and watermarked ML model, a class label that includes the at least one object, wherein the class label is the target label.

11. A method for watermarking a machine learning (ML) model for use in object detection, the method comprising:

selecting a set of training images for training the ML model;

selecting a first subset of images from the set of training images, each of the first subset of images having a plurality of objects, wherein each object of the plurality of objects is enclosed in a bounding box, and wherein each of the bounding boxes includes a class label of the enclosed object;

selecting a pixel pattern to use as a watermark in the first subset of images;

scaling the pixel pattern to have a same height and width as each image of the first subset of images to produce a scaled pixel pattern;

making each scaled pixel pattern of the first subset of images partly transparent;

overlaying the transparent and scaled pixel pattern on each image of the first subset of images to produce a modified first subset of images; and training the ML model with the set of training samples and the modified first subset of samples to produce a trained and watermarked ML model.

12. The method of claim 11 further comprising:

selecting a target class label that is unrelated to the class labels of the objects in the first subset of images; and relabeling the plurality of objects of a selected class of the first subset of images with the target class label.

13. The method of claim 12, wherein relabeling the plurality of objects of a selected class of the first subset of images with the target class label further comprises relabeling all the plurality of objects of each image of the first subset of images with the target class label.

14. The method of claim 11, further comprises removing the class labels of all the first subset of images.

15. The method of claim 11, wherein the ML model performs instance segmentation.

16. The method of claim 11, further comprising rescaling all images of the set of training images to be the same size.

17. The method of claim 11, further comprising applying a transformation to the pixel pattern comprising one or more of scaling a size of the pixel pattern by a randomly generated scale factor, rotating the pixel pattern over a predetermined angle, displacing the overlaid pixel pattern in one or both of a horizontal and a vertical direction relative to an image of the first subset of images by a predetermined number of pixels.

18. The method of claim 11, further comprising:

selecting a set of test images to use for testing the ML model after training;

selecting a second subset of images from the set of test images, each of the second subset of images having an object of the selected class;

overlaying the pixel pattern on each image of the second subset of images; and using the second subset of samples to identify the ML model.

19. The method of claim 11, further comprising:

operating the trained and watermarked ML model in an inference operating mode;

inputting an image having at least one object of the selected class; and outputting, by the trained and watermarked ML model a class label that includes the at least one object, wherein the class label is the target label.

20. The method of claim 11, wherein the first subset of images is randomly selected from the set of training images.

* * * * *